Patented Apr. 23, 1940

2,198,218

UNITED STATES PATENT OFFICE 2,198,218

WHEAT GERM PREPARATION

Sidney Musher, New York, N. Y., assignor to Musher Foundation Incorporated, New York, N. Y., a corporation of New York No Drawing. Application February 3, 1940, Serial No. 317,175

11 Claims. (Cl. 99—153)

This application relates to wheat germ preparations and more particularly to the preparation of substantially stable, novel wheat germ products which may readily be used in the food industry such as in the manufacture of bread and for addition to bleached and degerminated wheat flour and which wheat germ preparations are much more resistant to deterioration than ordinary wheat germ.

In accordance with the present invention, wheat germ in flake or particle form is mixed with slightly acidified liquid skim milk and the mixture of the wheat germ and skim milk is then put through a colloid mill or the wheat germ is otherwise finely divided in the skim milk. The wheat germ after such treatment is in finely dispersed form in the skim milk, preferably heated to an elevated temperature, and the mixture is then concentrated or dried to obtain a stable wheat germ preparation in paste, flake or powdered form.

The skim milk is adjusted to a pH of between about 4 and 6.8 and desirably to a pH of between 5.9 and 6.5, preferably before preparing the wheat germ-skim milk combination but certainly before the subsequent evaporating or concentrating procedures. The pH adjustment may be made by the addition of an organic acid, such as citric, lactic, tartaric or malic acid, or by such other acids as hydrochloric or phosphoric.

For example, a mixture may be prepared comprising 1 part of wheat germ and 5 parts of liquid unconcentrated skim milk and the mixture then adjusted to a pH of 6. While agitating, the wheat germ-skim milk combination is then put through a colloid mill. The large wheat germ particles are then broken into a fine dispersion aproaching colloidal size. Each individual dispersed particle of the wheat germ is intimately contacted with and coated by the skim milk.

Preferably, the slightly acidified wheat germ-skim milk mixture is put through the colloid mill a second time in order to obtain a better dispersion of the wheat germ particles.

The slightly acidified wheat germ-skim milk combination is thereupon concentrated to a total solids content of between about 40% and 75% and this concentrated product may then be drum dried or spray dried as by running on a heated roll or by subjecting the combination to an atmosphere of heated air. This combination may then be pulverized or powdered. In the resultant dried product, the wheat germ particles are finely dispersed with the skim milk.

Where a slightly acidified combination of wheat germ and skim milk on the basis of 1 part of wheat germ and 5 parts of skim milk is used, the finished dried product will contain about 31% skim milk solids and 69% wheat germ solids.

Other proportions may also be utilized such as from 3 to 10 parts of the liquid milk to each part of wheat germ.

In addition to using ordinary liquid unconcentrated milk, powdered skim milk may also be employed. The powdered skim milk may be ground with the wheat germ with the addition of water. The powdered skim milk is diluted with water, desirably to the approximate concentration of ordinary skim milk before mixture with the wheat germ. Partially concentrated or condensed skim milk may also be used with the wheat germ, the combination utilized in slightly acidified condition.

In any event, the wheat germ is finely divided and dispersed in the aqueous skim milk. It is not possible to obtain the results of the present invention by merely preparing a dry mixture of the wheat germ and the ordinary powdered skim milk without subjecting the wheat germ to the dispersion in the aqueous skim milk.

In place of the colloid mill treatment, other treatments may be employed in which the wheat germ particles are thoroughly ground to a fine paste or fine state of division and the individual particles of the wheat germ are substantially coated with and thoroughly intermingled with the milk solids.

The slightly acidified combination of the wheat germ and skim milk before powdering and while in aqueous form is desirably subjected to an elevated temperature treatment of at least about 170° F. to 180° F. and desirably to a temperature of about 200° F. to 210° F. for a short period varying from about a minute to an hour or more. It is not desirable for the temperature, however, to reach 250° F. and burning should be avoided.

The heat treatment is preferably applied to the skim milk-wheat germ combination after acidification, after the colloid mill or other fine grinding procedure, and after the combination contains, or has been partially evaporated to 30% or more total solids and desirably to about 50% total solids. The combination is heat treated in aqueous condition and while containing at least about 25% total water content. The solids of the combination are held in suspension in the aqueous medium during the elevated temperature treatment, using agitation if necessary.

The heat treatment to which the wheat germ-skim milk combination is subjected very definitely enhances the stability of the mixture and fortifies the dispersed wheat germ against deterioration as is indicated in the following example.

Example I

A mixture was prepared comprising 5 parts of liquid skim milk adjusted to a pH of 6 and 1 part of wheat germ by weight. In sample A, the combination was put through a colloid mill and after the wheat germ was finely dispersed throughout the skim milk, the combination was evaporated in a stainless steel vacuum pan to a total solids content of 50%. The concentrate was then dried in a vacuum oven at under 140° F. The temperature to which the combination was subjected at no time exceeded 140° F. The dried substance obtained was powdered.

Sample B was prepared in a similar manner except that immediately following the evaporating to 50% total solids, the wheat germ-skim milk combination was subjected to a temperature of 200° F. for 30 minutes.

In Sample C, a powdered mechanical mixture was prepared comprising 69% wheat germ and 31% powdered skim milk by weight, this combination being proportionate to the percentages of total solids of wheat germ and skim milk in samples A and B.

The powdered mechanical mixture of the wheat germ and skim milk was tested along with samples A and B by incubating at 125° F. until definite off odor and flavor were observed.

Off odor and flavor after—
Sample A_____ 8 days
Sample B_____ 20 days
Sample C_____ 4 days Apparently, some reaction occurs at the elevated temperature and in the proper concentration whereby the wheat germ in contact with the aqueous skim milk in slightly acidified condition acquires enhanced stabilization, and this elevated temperature treatment is very important in order to obtain the fully desirable stabilizing features of the present invention.

The heat treatment should be applied either during or after the colloid mill treatment. The most desirable enhanced stabilizing action is obtained when the wheat germ is thoroughly dispersed in the skim milk during the heat treatment and where the wheat germ has not been thoroughly dispersed in finely divided condition throughout the skim milk, the full degree of stabilization is not secured.

In addition to using ordinary skim milk in accordance with this invention, there may less desirably be employed lactated or "clabber" skim milk, buttermilk, liquid whole milk and other forms of milk-solids-not-fat in liquid, pasty or viscous condition and containing less than about 40% total solids and preferably less than 15% total solids. These various milk products are referred to herein as "milk-solids-not-fat." These milk products are all desirably acidified when heated with the wheat germ.

After the slightly acidified wheat germ-skim milk combination has been heated and, where desired, condensed, if the combination is too thick to be handled satisfactorily on the heated drying rolls, an additional amount of liquid skim milk or other similar diluent may be added.

It has also been found desirable to add immediately before drying a relatively small amount, varying from about 5% to 12% of the dry solids weight, of a cereal such as wheat flour or maize flour. The drying on the heated rolls then proceeds more readily.

If the pH of the skim milk-wheat germ combination is reduced to under about 5.9, some precipitation of the milk solids takes place which is objectionable if the finished product is dried by any means other than by exposing to heated air in a relatively thin film on trays. For this reason, a pH of about 6 is most desirable.

Preferably, immediately before final drying, the pH of the combination may be adjusted by the use of sodium bicarbonate or similar material to from 6.5 to 6.7.

A very desirable stabilized novel wheat germ composition has been prepared in the following manner.

*Example II*

A mixture was prepared comprising 5 parts by weight of liquid skim milk and 1 part by weight of wheat germ. The combination was put through a colloid mill and the pH adjusted to 6 by the use of lactic acid.

This mixture was heated to 200° F. for 30 minutes. The heavy sludge was then diluted with 3 parts of additional liquid skim milk.

To this combination was also added one-sixth part bleached wheat flour and the mixture neutralized with sodium bicarbonate to a pH of 6.6.

The combination was then dried on a heated drum and the dried product pulverized.

The temperature to which the wheat germ composition is subjected should not be so high as to cause burning but the development of a caramelized odor is desirable.

Less preferably, the wheat germ may be ground to a mesh of between 100 or 120 or more, mixed with the liquid milk, evaporated to about 30% or more total solids, and then while in aqueous condition, subjected to the elevated temperature to produce the enhanced stabilizing effect. The most desirable results are, however, obtained where a colloid mill or other similar grinding treatment is employed in order thoroughly to disperse the particles of the wheat germ throughout the liquid aqueous skim milk.

The wheat germ preparation thus obtained is very desirably employed for addition to wheat flour, for use in baking, for candies and confections and for sale as a specially novel and stable food composition high in vitamin value and which will keep for long periods of time without deterioration and substantially free of such forms of deterioration as infestation, rancidity, mould development and particularly protein decomposition.

In accordance with the present invention, the solid portion of the wheat germ preparation will contain approximately 40% to 70% or more of wheat germ and the balance milk solids. Where it is desired for any special purpose to have a product in which a higher proportion of skim milk is present, an additional quantity of skim milk, preferably concentrated or condensed, may be added to the ordinary liquid skim milk at the time of admixture with the wheat germ or a more concentrated liquid skim milk may be employed for combination with the wheat germ.

Where desired, after the wheat germ has been thoroughly dispersed throughout the skim milk, placed through a colloid mill and in slightly acidified condition preferably followed by the elevated temperature treatment, the undissolved wheat germ solids may be removed by filtration or centrifuging. The resultant skim milk soluble portion may thereupon be concentrated to between about 50% and 70% or more total solids and then, where desired, dried in order to obtain a substantially water miscible or water soluble preparation.

Where the undissolved wheat germ solids are removed by filtration, it has been observed that the filtrate not only contains highly desirable nutritious vitamin elements of the wheat germ, but also contains a large portion of the wheat germ oil which has been emulsified into the aqueous mixture.

The filtrate after powdering is a highly nutritious product which may be employed principally for addition to aqueous materials such as milk, cream and ice cream. It may also be added to candies, confections, meat products such as sausage or used in general as a highly nutritious food product or food ingredient.

Where desired, there may be added to the skim milk-wheat germ combination a small amount, less than about 5% against the solids weight, of a combination of a sugar and a phosphatide such as a combination of equal parts of dextrose and lecithin. Particularly where the slightly acidified combination is subjected to the elevated temperature, there is obtained greatly enhanced stabilization.

Where both dextrose and lecithin are employed, both the dextrose and lecithin as well as the wheat germ may be finely dispersed throughout the aqueous medium as by running through a colloid mill. The dextrose and lecithin may also be first dispersed in water which is then added to the skim milk before or after dispersion of the wheat germ therein. Or the wheat germ may be dispersed together with dextrose and lecithin in water in a colloid mill. During or following the colloid mill treatment, the mixture is desirably heated to a temperature in excess of about 200° F. and desirably to as high as 212° F.

Together with or in lieu of the wheat germ, it is also possible to utilize corn germ, oat germ, rice germ, polish or bran, and peanut germ.

It is also possible to include carotene or high carotene materials together with the wheat germ.

The above germs may also less preferably be in part or whole de-oiled before being dispersed in the liquid skim milk.

The germ, and particularly the wheat germ may desirably be subjected to a "puffing" operation before preparation with the skim milk.

For example, wheat germ may be put into a "puffing gun" which is heated to about 350° F. to 600° F. and into which steam is introduced so that the internal pressure reaches 200 to 350 pounds or more per square inch. After a period of about 5 seconds to several minutes, the pressure may be released and the germ discharged.

This application is a continuation in part of applications, Serial No. 237,466, filed October 28, 1938; Serial No. 239,319, filed November 7, 1938; and Serial No. 285,354, filed July 19, 1939.

Having described my invention, what I claim is:

1. A process of making a stabilized wheat germ preparation which comprises finely dispersing wheat germ in aqueous skim milk, concentrating and then heating to at least 180° F., said preparation including a relatively small amount of the skim milk solids with respect to the wheat germ solids.

2. A process of making a stabilized wheat germ preparation which comprises dispersing wheat germ in finely divided condition in aqueous milk-solids-not-fat and then heating to a temperature of at least 180° F., said preparation including a major proportion of wheat germ solids with respect to the solids of the milk-solids-not-fat.

3. A process of making a stabilized wheat germ preparation which comprises dispersing wheat germ in aqueous slightly acidified milk-solids-not-fat and then concentrating, said aqueous dispersion having been heated during processing to a temperature of at least 200° F., and said wheat germ and milk-solids-not-fat having a pH of between about 4 and 6.8 before heating, said wheat germ preparation including a minor proportion of the milk-solids-not-fat with respect to the wheat germ solids.

4. A process of making a stabilized wheat germ preparation which comprises combining finely divided wheat germ with a relatively small amount of milk-solids-not-fat dispersed in water and then concentrating, said aqueous disperson having been heated during processing to a temperature of at least 200° F.

5. A process of making a stabilized wheat germ preparation which comprises dispersing wheat germ in finely divided condition in aqueous milk-solids-not-fat, heating to a temperature of at least 170° F., and then drying, the milk-solids-not-fat being present in a relatively small amount as the stabilizing agent.

6. A process of making a stabilized cereal germ preparation which comprises dispersing a cereal germ in finely divided condition in aqueous milk-solids-not fat and then heating to a temperature of at least 170° F., said preparation including a major proportion of cereal germ solids with respect to the solids of the milk-solids-not-fat.

7. A process of making a stabilized cereal germ preparation which comprises dispersing a cereal germ in finely divided condition in milk-solids-not-fat, heating to a temperature of at least 200° F., adding a maize flour, and then drying, said preparation including a relatively small proportion of the milk-solids-not-fat.

8. A stabilized wheat germ preparation containing a small proportion of milk-solids-not-fat and a large proportion of wheat germ on their solids weight basis, said wheat germ and milk-solids-not-fat having been heated while in a dispersed aqueous condition to a temperature of at least 170° F. whereby the preparation is substantially stabilized against oxidative deterioration.

9. A dried stabilized wheat germ preparation containing a minor proportion of skim milk and a major proportion of wheat germ on their solids weight basis, said wheat germ and skim milk having been heated while in a dispersed aqueous condition to a temperature of at least 180° F. whereby the preparation is substantially stabilized against oxidative deterioration.

10. A stabilized cereal germ preparation containing a minor proportion of milk-solids-not-fat and a major proportion of cereal germ on their solids weight basis, said cereal germ and milk-solids-not-fat having been heated while in a dispersed aqueous condition to a temperature of at least 180° F. whereby the preparation is substantially stabilized against oxidative deterioration.

11. A dried stabilized cereal germ preparation containing a minor proportion of skim milk and a major proportion of cereal germ on their solids weight basis, said cereal germ and skim milk having been heated while in a dispersed aqueous condition to a temperature of at least 180° F. whereby the preparation is substantially stabilized against oxidative deterioration.

SIDNEY MUSHER.